Patented Sept. 27, 1927.

1,643,804

UNITED STATES PATENT OFFICE.

RICHARD H. BOTS, OF SYRACUSE, NEW YORK.

PROCESS OF MANUFACTURING VANILLIN.

No Drawing.   Application filed January 25, 1926. Serial No. 83,728.

The most accepted and best known method for the making of vanillin consists in treating oil of cloves with potassium hydroxide at around 200° Cent. By this treatment the eugenol contained in the oil of cloves is transformed into a potassium compound of iso-eugenol. The iso-eugenol is then set free by the use of diluted sulphuric acid, and is extracted by the use of some solvent such as benzol. By distilling off the solvent the free iso-eugenol is obtained.

The further steps in the manufacture of vanillin as heretofore known consists, generally, in acetylating iso-eugenol and then oxidizing with some inorganic oxidizing agent such as ozone, potassium permanganate or dichromate, under varying conditions of temperature and sometimes with the addition of some other compounds which it is claimed facilitate the oxidizing action of the oxidizers used. Finally pure vanillin is obtained by using various processes generally used in the purification of chemical compounds.

My process is distinguished by the fact that it is not necessary to liberate the iso-eugenol from its potassium compound, and that the mass obtained by heating oil of cloves with potassium hydroxide at around 200° Cent. may be used directly in the further steps of the process.

My process is also distinguished by the fact that a nitro compound, such as nitro-benzol or mono nitro-toluol is used as an oxidizing agent. These nitro compounds, by giving up part of their oxygen, are themselves transformed into a very valuable product. For instance, in the case of nitro-benzol being used, the nitro-benzol, by giving up part of its oxygen, is transformed into azobenzol, a very valuable by-product which is easily and at small cost transformed into hydrazobenzol, which itself easily gives benzidine. It is a known fact that the most common method of obtaining hydrazobenzol consists in treating nitro-benzol with zinc dust in the present of caustic soda. As is well known, zinc dust is a relatively expensive product. I avoid the use of zinc dust.

In my process nitro-benzol, by giving up its oxygen to iso-eugenol, is itself reduced to azo-benzol, which can be easily transformed into hydrazobenzol without the use of the expensive zinc dust. In a similar way, ortho-nitro-toluol, by giving up its oxygen, is itself transformed into azo-toluol, which can then be easily transformed into hydrazotoluol which, in turn, can be transformed into tolidine, all at a very small cost.

The oxidation of the combination of potassium with iso-eugenol by means of a nitro compound is greatly facilitated by the presence of an excess of an alkali such as sodium hydroxide. This oxidation is still further facilitated by first dissolving the potassium compound of iso-eugenol in an amino compound such as aniline or ortho-toluidine. A good way of operating is as follows:

The mixture of oil of cloves and potassium hydroxide which has been heated to around 205° Cent. is dissolved in an excess of aniline. The dissolving of the solid mass into the aniline is greatly accelerated by using moist aniline, such as aniline which has stood overnight in contact with water. When using absolutely dry aniline the solution is not completed after heating the mixture at 165–170° Cent. for 6 hours. If, however, moist aniline is used, the solution is completed in about 3 hours by keeping the mixture about 100° Cent. A large excess of aniline may be used for this operation.

When the solid mass has entirely entered in solution into the aniline, a good way of operating is to then add a strong solution of caustic soda in water and then distill off a great deal of the excess of aniline used. A satisfactory way of doing this is to raise the temperature of the mixture to about 125° Cent. and introduce a jet of steam over the top surface of the mixture. The steam which escapes is then condensed by means of a condenser and carries with it a great deal of aniline. This operation is very similar to a regular steam distillation, but differs from it in that it is not necessary to introduce the steam directly into the solution.

When the greater part of the excess aniline has distilled over, the mass, while still hot and before it has a chance to solidify, is drawn off into a covered apparatus having an efficient stirrer and containing an excess of cold nitro-benzol. Ortho-nitro-toluol may also be used.

If, after stirring the mixture thoroughly, the mass so obtained is set aside and let stand for several days at room temperature, it will be found that the iso-eugenol has been transformed into vanillin and part of the nitro-benzol has been reduced to azo-benzol.

If, on the contrary, the mixture is heated to about 115° Cent. while the stirrer is still in operation, the reaction will take place suddenly and rather violently. Again iso-eugenol will have been oxidized to vanillin and some nitro-benzol will have been reduced to azo-benzol.

The best way of operating is to keep the above mixture at 100° Cent. for about 2 hours, when the reaction will be practically complete and direct steam may be introduced. This will distill over the excess of aniline and of nitro-benzol. If it should happen that the reaction was not complete at the moment of introducing the steam, the reaction will still go on during the steam distillation. The distillate obtained will contain about equal parts of aniline and of nitro-benzol, according to the amounts of aniline and nitro-benzol used in the process.

When all the aniline and nitro-benzol has been distilled over, the mass, while still around 80° Cent. is drawn off into an open settling kettle. Enough water is added to ensure complete solution of the alkali compound with vanillin, and the mass is then allowed to cool down. The azo-benzol, which is insoluble in water, will settle to the bottom. The supernatant liquor is decanted, making sure that it does not contain any azo-benzol. The aqueous solution is concentrated and cooled down and the alkali combination with vanillin will crystallize out in reddish brown crystals. On separating these crystals from their mother liquors and treating them with sulphuric acid in an appropriate manner, crude vanillin is obtained. The mother liquors are in turn treated with sulphuric acid and worked up in an appropriate manner for the recovery of the vanillin contained in them.

From the foregoing it will be noted that, starting from oil of cloves and finishing with a solution of vanillin in a strong alkaline solution, there are three successive steps in the process:

1. Heating the mixture of oil of cloves and potassium hydroxide to around 205° Cent.

2. Dissolving the mass so obtained in an amino compound such as aniline, ortho-toluidine, then adding a strong caustic soda solution and recovering, by steam distillation, the greater part of the excess amino compound used.

3. Treating the mixture so obtained with a nitro-compound such as nitro-benzol, ortho-nitro-toluol; and then recovering by steam distillation the excess amino compound and nitro compound used.

In order to carry out successfully the first step it is essential that every particle of the mass obtained should reach a temperature of about 205° Cent. Superheating should be avoided and access of the oxygen of the air should be prevented. A steel-jacketed kettle having a cover provided with the necessary holes should therefore be used. The bottom should be flat so that the mass will be a uniform layer of not more than three inches thick. The heating should be done preferably with some automatically controlled oil-heating system. It is best not to allow the temperature of the oil to exceed 210° Cent. Means should be provided for the admission of superheated steam near the cover of the kettle. This will permit expulsion of air and, in the second step of the operation, will allow the distillation of the excess aniline by means of steam. There should also be a bottom outlet.

Example: Into a kettle similar in construction to the one just described, introduce 55 pounds of potassium hydroxide (80%); add about 50 pounds of water. When the solution is complete, heating gently if necessary, add 100 pounds of oil of cloves. Heat gradually at first to about 125° Cent., then more rapidly to 210° Cent. Also introduce at the top of the kettle some superheated steam (preferably superheated to 205–210° Cent.).

Keep the temperature of the oil in the jacket at around 210° Cent. for about ½ hour to ¾ hour. Then cool the oil down to around 180° Cent. and, without shutting off the steam jet at the top of the kettle, introduce 400 to 500 pounds of aniline saturated with water. When all the aniline has been introduced shut off the steam jet. Keep the temperature of the aniline at about 100° Cent. for 3 hours. After that time open the manhole, taking the necessary precautions to prevent any aniline vapors escaping through the manhole, as aniline vapors when inhaled are deadly. By means of a small paddle make sure that all lumps are dissolved. When there are no lumps left add 100 pounds of a 50% caustic soda solution in water. Raise the temperature of the mass to around 125° Cent. Open the steam jet on top of the kettle; condense the vapors distilling over. Collect about 200 to 300 pounds of aniline. Stop the steam distillation. The total time required so far is 6 to 7 hours.

While still around 125° Cent. introduce the contents of the kettle into a covered kettle which is much larger, has an efficient stirrer and contains about 200 pounds of cold nitro-benzol. The temperature of the mixture then will be around 65° Cent. Heat the contents (using indirect steam) to 100° Cent. Watch the temperature carefully so that it shall not exceed 100° Cent. for two hours. After that time introduce direct steam until all the aniline and all the nitro-benzol has distilled over, or until, on taking some of the distillate in a small beaker, orange crystals of azo-benzol can be seen. Cool down to around 80° Cent. Draw off in a settling kettle, where the azo-benzol is separated from the vanillin compound.

In a regular run and using oil of cloves containing 85% of eugenol, the yields of pure vanillin melting at 81.75° Cent. to 82° Cent. will be around 56 pounds or around 71.5% of the theoretical amount. There is also obtained about 60 pounds of crude azo-benzol which can be transformed into benzidine.

It will be seen that a mixture of about equal parts of aniline and intro-benzol is obtained. The aniline may be separated from the nitro-benzol by fractionation. It may also be deemed preferable to reduce the nitro-benzol contained in this mixture to aniline, as in a regular aniline manufacturing plant.

The advantages of my process over the known processes using oil of cloves as a starting point are:
1. Simplicity in operation.
2. Low cost of raw material used, besides the oil of cloves.
3. Practically no loss in raw materials, as the aniline and nitro-benzol are recovered. The potassium and sodium hydroxides used are transformed into the corresponding sulphates and these are the only raw materials which may be discarded.
4. There is some nitro-benzol which is transformed into azo-benzol. The yield of azo-benzol is about the same as that of vanilin; for each pound of vanillin produced there is produced about 1 pound of azo-benzol.

What I claim is:
1. The process of oxidizing a carbon compound having a benzene nucleus with a lateral chain $CH=CH-CH_3$ to produce the corresponding aldehydes, which consists in treating said compound with nitro-benzol.
2. The process of oxidizing a carbon compound having a benzene nucleus with a lateral chain $CH=CH-CH_3$ to produce the corresponding aldehydes, which consists in treating said compounds with nitro-benzol and an excess of a free alkali.
3. The process of oxidizing a carbon compound having a benzene nucleus with a lateral chain $CH=CH-CH_3$ to produce the corresponding aldehydes, which consists in treating said compounds with nitro-benzol and an excess of caustic soda.
4. The process of producing vanillin, which consists in treating an alkali compound of iso-eugenol with nitro-benzol and an excess of a free alkali.
5. The process of producing vanillin, which consists in treating an alkali compound of iso-eugenol with nitro-benzol and an excess of NaOH.
6. The process of producing vanillin, which consists in treating a potassium compound of iso-eugenol with nitro-benzol and an excess of a free alkali.
7. The process of producing vanillin, which consists in treating a potassium compound of iso-eugenol with nitro-benzol and an excess of NaOH.
8. The process of oxidizing a carbon compound having a benzene nucleus with a lateral chain $CH=CH-CH_3$ to produce the corresponding aldehydes, which consists in dissolving said compound in an amino compound and treating said solution with nitro-benzol in the presence of a free alkali.
9. The process of oxidizing a carbon compound having a benzene nucleus with a lateral chain $CH=CH-CH_3$ to produce the corresponding aldehydes, which consists in dissolving said compound in aniline and treating said solution with nitro-benzol in the presence of a free alkali.
10. The process of oxiding a carbon compound having a benzene nucleus with a lateral chain $CH=CH-CH_3$ to produce the corresponding aldehydes, which consists in dissolving said compound in aniline and treating said solution with nitro-benzol in the presence of NaOH.
11. The process of producing vanillin, which consists in dissolving a potassium compound of iso-eugenol in an amino compound and then treating the mixture with nitro-benzol in the presence of an excess of a free alkali.
12. The process of producing vanillin, which consists in dissolving a potassium compound of iso-eugenol in aniline and then treating the mixture with nitro-benzol in the presence of an excess of a free alkali.
13. The process of producing vanillin, which consists in dissolving a potassium compound of iso-eugenol in aniline and then treating the mixture with nitro-benzol in the presence of an excess of NaOH.

In testimony whereof I hereunto affix my signature.

RICHARD H. BOTS.